UNITED STATES PATENT OFFICE.

EMERY E. CHILDS, OF BROOKLYN, NEW YORK.

PREPARATION OF CASEINE AND OF ARTICLES MADE THEREFROM.

SPECIFICATION forming part of Letters Patent No. 307,179, dated October 28, 1884.

Application filed March 21, 1884. (No specimens.)

*To all whom it may concern:*

Be it known that I, EMERY E. CHILDS, of Brooklyn, in the county of Kings and State of New York, have invented a new and useful Improvement in the Preparation of Caseine and of Articles made Therefrom, of which the following is a full, clear, and exact description.

The invention has for its object the production of a cheap and superior quality of caseine from milk-curd direct or common cheese—that is, cheese made from skimmed milk as distinguished from more expensive or "pot" cheese—said products to be used in the manufacture of various useful and ornamental articles.

The invention consists in a novel process of producing the caseine, and in the product as obtained by said process, substantially as hereinafter described.

I take, for instance, milk-curd or cheese reduced to a fragmentary condition and made from skimmed milk with or without salt and coloring-matter, and immerse the same in water at or near the boiling-point, and thoroughly work or knead it in said water at such high temperature for about fifteen minutes, more or less, when by such continual agitation of the curd or cheese the fat or other impurities will be separated therefrom, and leave the caseine pure, or nearly so, and in the condition of a tough and glutinous mass. To effect this result it is necessary not only that the curds or cheese should be so thoroughly agitated in water at or near the boiling-point as to constitute a kneading of it, but that this working or kneading of the cheese should not be continued longer than is required to bring it to its specified tough and glutinous condition; otherwise the caseine will be reduced to a soft and pulpy state. The caseine thus prepared may then be pressed into sheets or molds of any desired form, and will make a material cheaper and superior to that made from caseine which has been treated with benzine, an alkali, acetic, or other acid. This process essentially differs from other processes of producing various compositions made up of caseine and emery or other like gritty and coloring matters, and in which not only an alkali or acid is used, but in which, or others of which, a preparatory cooking at a low temperature is necessary, then the milk product allowed to cool, then mixed with various ingredients, and afterward said compound simply washed in boiling-water. If desired, coloring-matter or other ingredients—such as ground ivory, bone, porcelain, &c.—may be mixed with the caseine prepared as I have described under my process, according to the articles desired to be imitated or produced; but this should not be done until after the caseine has been prepared and brought to the condition I have herein described, when or after which the mixing may be effected by immersing the caseine in fresh water heated to a high temperature and stirring or working the glutinous mass for about ten minutes, more or less, when said mass will soften and the coloring-matter or other ingredients can be mixed and the mass then pressed into sheets or molds. It is, however, the original preparation of caseine, by working or kneading for a limited time the milk-curds or skim-milk cheese in water at or near the boiling-point, which constitutes or forms the main part of my invention. The caseine thus prepared is designed to include various articles of ornament or use made of or from it with or without other ingredients.

Having thus described my invention, I claim as new and desire to secure by Letters Patent—

1. The within-described process of extracting and preparing caseine from milk-curd or cheese, which consists in working or kneading the curd or cheese in water at or near the boiling-point until it reaches a tough and glutinous consistency and the fatty and other objectionable matters have been mainly eliminated from it, substantially as specified.

2. Caseine prepared from milk-curd or cheese worked or kneaded in water at a high temperature, essentially as specified.

3. Caseine prepared from milk-curd or cheese worked or kneaded in water at a high temperature, and afterward with or without the addition of other ingredients pressed or molded into shape, substantially as specified.

EMERY E. CHILDS.

Witnesses:
A. GREGORY,
EDGAR TATE.